United States Patent
Karlsson et al.

(10) Patent No.: US 8,419,406 B2
(45) Date of Patent: Apr. 16, 2013

(54) DYNAMIC MOULD TOOL

(75) Inventors: Roland Karlsson, Ängelholm (SE); Jerry Stigsson, Idgränd (SE); Anders Paulsson, Jönköping (SE)

(73) Assignee: DIAB International AB, Laholm (SE)

( * ) Notice: Subject to any disclaimer, the term of this patent is extended or adjusted under 35 U.S.C. 154(b) by 357 days.

(21) Appl. No.: 12/527,678

(22) PCT Filed: Jun. 11, 2007

(86) PCT No.: PCT/SE2007/050408
§ 371 (c)(1),
(2), (4) Date: Aug. 18, 2009

(87) PCT Pub. No.: WO2008/103093
PCT Pub. Date: Aug. 28, 2008

(65) Prior Publication Data
US 2010/0034918 A1 Feb. 11, 2010

(30) Foreign Application Priority Data
Feb. 19, 2007 (SE) ...................... 0700420

(51) Int. Cl.
*B29C 43/02* (2006.01)
*B29C 43/32* (2006.01)
(52) U.S. Cl.
USPC .......... 425/149; 425/234; 425/338; 425/408; 425/DIG. 47
(58) Field of Classification Search ............... 425/149, 425/233, 234, 338, 407–408, DIG. 47; 249/126
See application file for complete search history.

(56) References Cited

U.S. PATENT DOCUMENTS 2,768,407 A   10/1956 Lindemann
3,868,204 A * 2/1975 Bongers .................. 425/338
(Continued)

FOREIGN PATENT DOCUMENTS

EP   0 825 010 A2   2/1998
EP   1849575 A1    10/2007
(Continued)

OTHER PUBLICATIONS

Monika Bohlin; International Search Report in PCT/SE2007/050408; Apr. 25, 2008; 6 pages; Swedish Patent Office; Stockholm, Sweden.

(Continued)

*Primary Examiner* — Richard Crispino
*Assistant Examiner* — Thukhanh Nguyen
(74) *Attorney, Agent, or Firm* — Hedman & Costigan, P.C.; James V. Costigan

(57) ABSTRACT

Mould tool to be arranged in a press with essentially parallel press surfaces for production of rigid expanded polymer embryo bodies, the mould tool comprises a first mould member and an second mould member that are moveable with respect to each other in a direction perpendicular to the press surfaces, and sealing means providing an essentially hermetic seal between the first and second mould member during at least a portion of such a relative motion, thereby defining a closed mould cavity of variable volume, wherein the first mould member defines at least a portion of the mould cavity volume and comprises an outer peripheral edge, and the second mould member comprises a rim that closely circumscribes the outer peripheral edge of the first mould member and wherein the sealing means is arranged in the gap formed between the rim and the outer peripheral edge.

21 Claims, 9 Drawing Sheets

U.S. PATENT DOCUMENTS

| | | | |
|---|---|---|---|
| 3,974,872 A * | 8/1976 | Buhrer | 249/126 |
| 4,133,858 A | 1/1979 | Hayakawa | |
| 4,409,170 A * | 10/1983 | Stofko | 425/419 |
| 4,569,647 A * | 2/1986 | McCormick | 425/117 |
| 4,824,617 A | 4/1989 | Takeuchi | |
| 6,352,421 B1 | 3/2002 | Olivier | |
| 2007/0264451 A1* | 11/2007 | Yusa et al. | 428/34.1 |
| 2009/0140447 A1* | 6/2009 | Kawamura et al. | 425/4 R |

FOREIGN PATENT DOCUMENTS

| | | | |
|---|---|---|---|
| JP | 55-5839 | | 1/1980 |
| JP | 409216238 | | 8/1997 |
| JP | 9-286029 A | | 11/1997 |
| JP | 409286029 | | 11/1997 |
| JP | 2002-307482 | * | 10/2002 |
| JP | 2002307482 | | 10/2002 |
| JP | 2003-251645 | | 9/2003 |
| JP | 2005238726 | | 9/2005 |
| JP | 2006-159898 | * | 6/2006 |
| WO | WO98/31521 | | 7/1998 |

OTHER PUBLICATIONS

Canadian Patent Office Letter of Oct. 19, 2012.

* cited by examiner

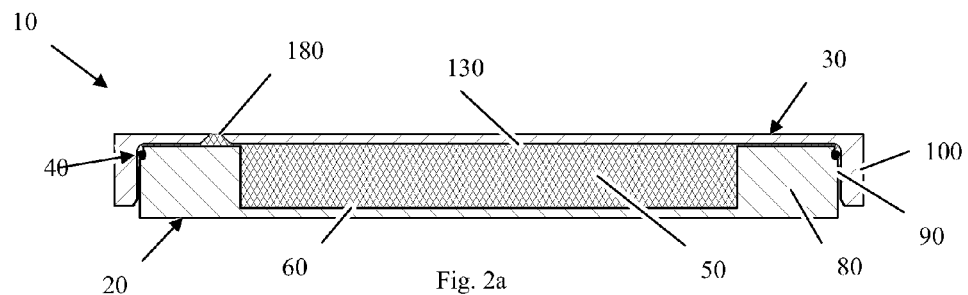
Fig. 2a
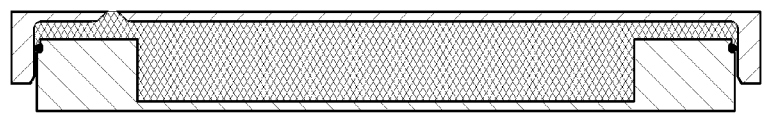
Fig. 2b
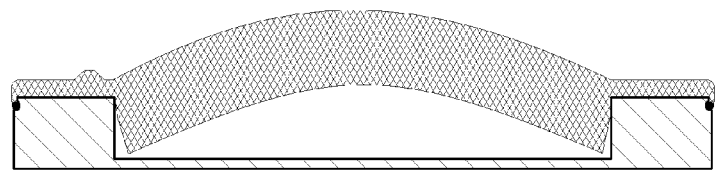
Fig. 2c
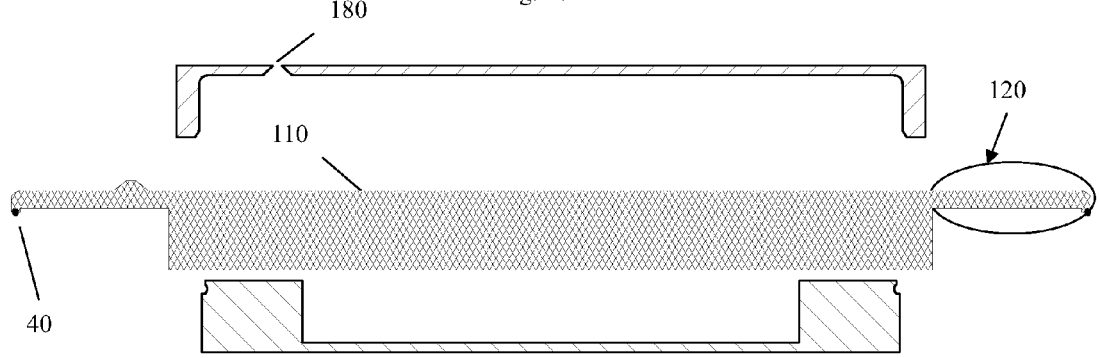
Fig. 2d

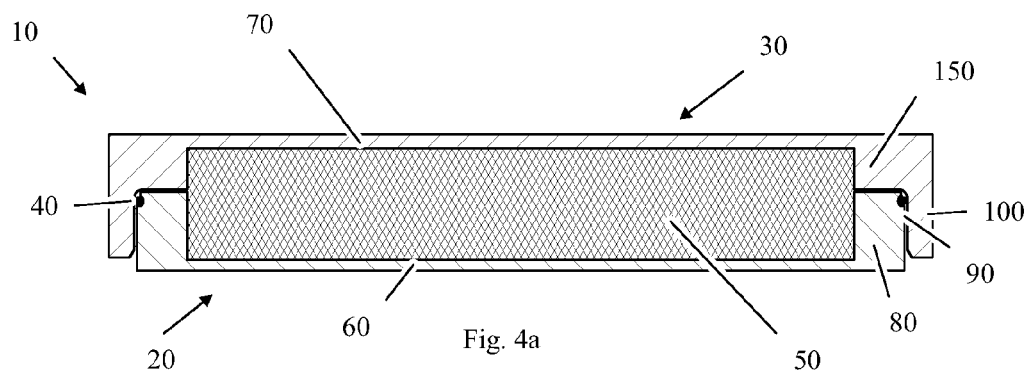
Fig. 4a
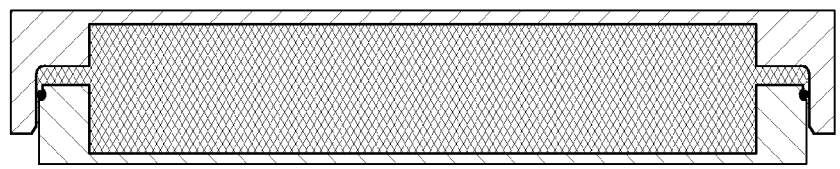
Fig. 4b
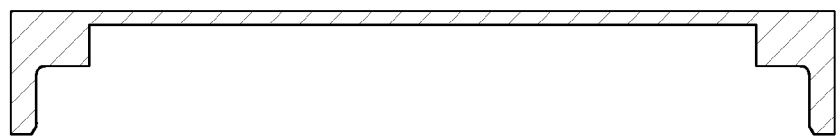
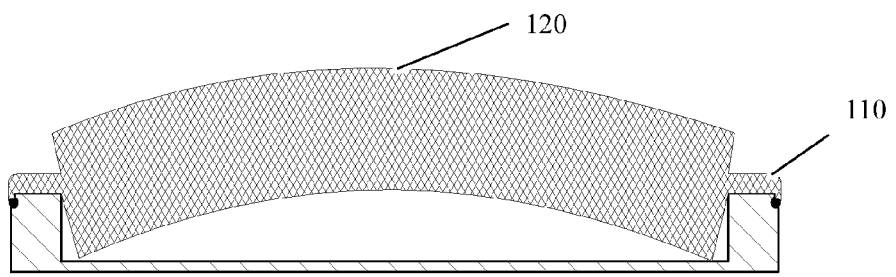
Fig. 4c

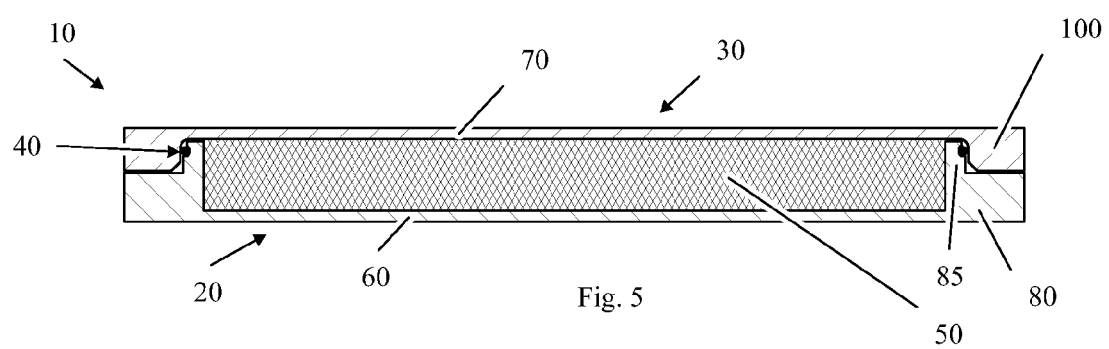

DYNAMIC MOULD TOOL

THE FIELD OF THE INVENTION

The present invention relates to a mould tool, more in detail the invention relates to a mould tool to be arranged in a press with essentially parallel press surfaces for production of rigid expanded polymer embryo bodies.

BACKGROUND OF THE INVENTION

Today, PVC based rigid foam polymer materials are being widely used, mainly as core material in sandwich structures in the naval or aeronautic sector, or as thermal/acoustic insulators in the building sector. In a sandwich structure the core separates two structurally more rigid materials, such as fibre reinforced plastics (FRP), metal or the like. Such sandwich structures have many advantages compared to more traditional single layer structures, such as lower weight, insulation properties etc. Whilst other rigid foam polymer materials, such as foamed polyurethane etc. can be produced using streamlined continuous extrusion methods, the production of PVC based rigid foam polymer materials involves moulding of discrete partially expanded bodies (hereafter referred to as embryo bodies) under high pressure in a press. The embryo bodies are subsequently subjected to a chemical-physical treatment to obtain the rigid foam polymer material.

More in detail, the production process of a PVC based rigid foam polymer material initially involves formation of a plastisol paste consisting of a mixture of powders (PVC and other compounds) and liquid substances (in particular isocyanates). The paste filled in a closed mould cavity and is subjected to a heating and subsequent cooling process under high pressure resulting in a partially expanded embryo body. The embryo body is then further expanded through an additional heat treatment in water and/or a steam oven. The formation of the final rigid foamed material is a result of a hydrolysis reaction of the isocyanate groups present in the material, with subsequent build up of a polymer which crosslink the chemical structure.

At present, the methods for the production of embryo bodies involves filling the each mould with an excess amount of paste with respect to the polymer content in the finished product. The excess amount is then allowed to leak out from the mold during the molding process. The moulding process comprises heating the plastisol in a closed mould, whereby a high pressure is created by the thermal expansion of the plastisol and the activation of the blowing agent dissolved therein. During this expansion step, the excess amount is allowed to leak out. The plastisol is kept at elevated temperature a predetermined time to allow the plastisol to gelatinize, where after the mould cavity is cooled to a temperature that is low enough to remove the embryo body from the mould. The excess amount is approximately equal to about 8%, in terms of weight, of the product leaving the mould.

The excess paste emerges from the top edge of the mould. Consequently there is a non-recoverable wastage of material, since the PVC gelatinizes and some of the blowing agent substances deteriorate at the high temperature.

U.S. Pat. No. 6,352,421, Olivier Giacoma, filed 2000 Feb. 15, solves the problem of escape of paste from the mould during the heating step by providing a secondary mould compartment into which the excess of paste is fed during the heating step, and from which a small part of the paste is allowed to escape into a perimetral waste-collecting groove. According to the disclosed method, paste is top-filled in the primary mould compartment, during heating the paste expands about 8% and excessive paste is fed to the secondary compartment by connecting grooves. The secondary compartment has a volume that is slightly less than 8% of the primary compartment. Hence, the amount of waste paste is reduced to about 8% of the volume of the secondary compartment, which is approximately equal to 0.64% of the volume of the primary compartment.

U.S. Pat. No. 2,768,407, Lindemann, Filed Dec. 5, 1950, relates to production of closed cell cellular bodies from thermo-plastic masses. It is stated that a problem in the prior art is that it is in practice impossible to keep a mould filled with a mass containing an expansion agent completely sealed during the heating stage. A solution to this problem is proposed: by, after the gases have been dissolved under pressure in the mass and the mass has gelatinised completely, expanding the volume of the mould by ⅕ to ⅖ of the original volume. Use of a mould with a moveable die is proposed, and it is stated that it is necessary to apply a high pressure e.g. 150-300 atm (bar) to slow down the decomposition of the expansion agent and to cause the gas to dissolve. It is also stated that suitable thermo-plastics include polyvinyl-chloride.

SUMMARY OF THE INVENTION

The object of the invention is to provide a new mould tool for production of rigid expanded polymer embryo bodies which overcomes the drawbacks of the prior art. This is achieved by the mould tool as defined in the independent claims.

Like in all materials production processes, important parameters for moulding embryo bodies when producing rigid expanded polymer materials are e.g. materials consumption, energy consumption, work flow and throughput time. The proposed mould tool is superior to the prior art with respect to at least one of these parameters.

Embodiments of the invention are defined in the dependent claims.

BRIEF DESCRIPTION OF THE DRAWINGS

The invention will be described in detail below with reference to the drawings, in which:

FIGS. 2a to 2d schematically show a cross sectional view of the the mould tool of FIG. 1 along A-A, in the different stages of moulding an embryo body.

FIGS. 4a to 4c show still another embodiment of the mould tool.

FIG. 5 shows still another embodiment of the mould tool.

DETAILED DESCRIPTION OF PREFERRED EMBODIMENTS

Figure 1:
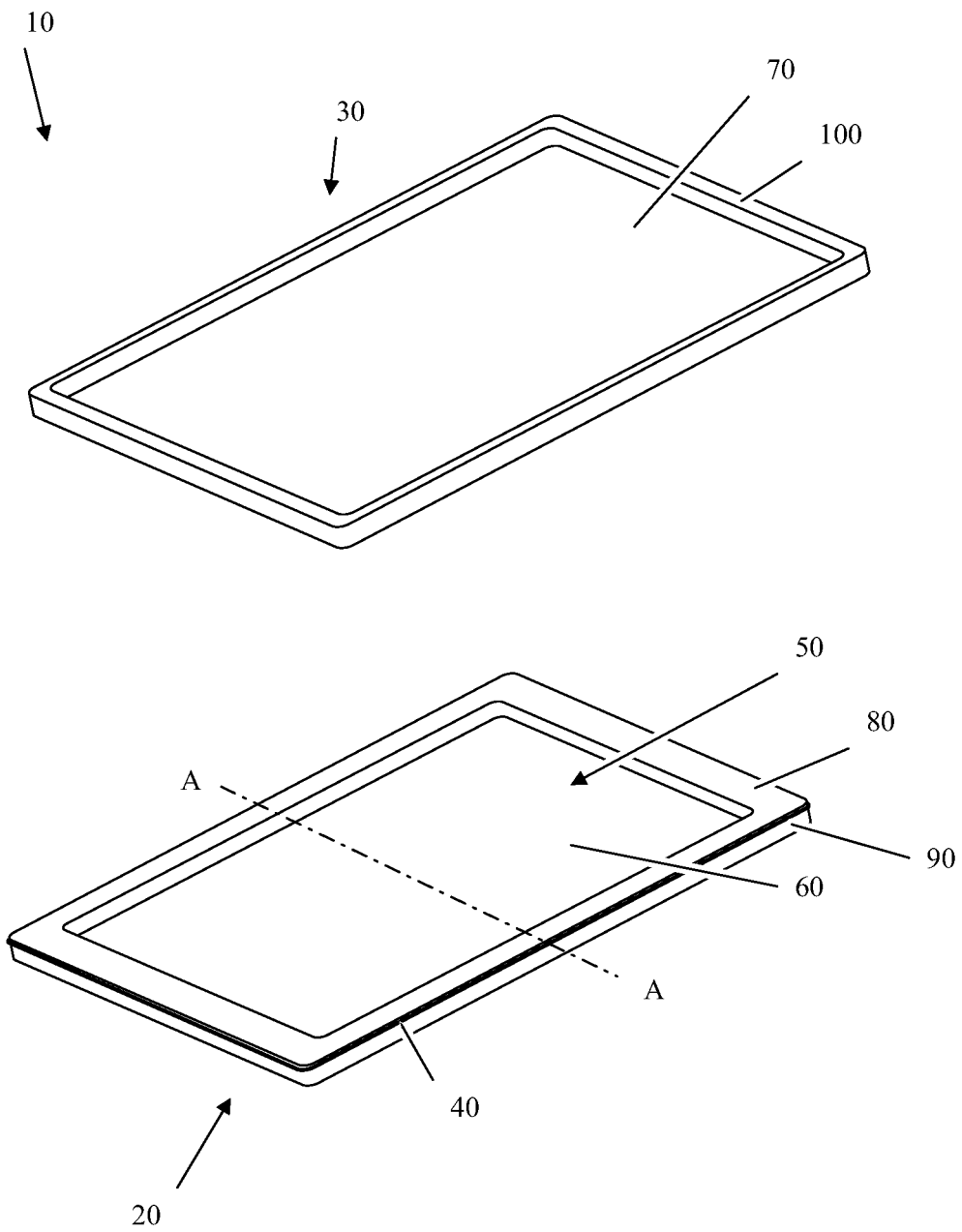
FIG. 1 is a schematic perspective view of a first embodiment of a mould tool 10 according to the present invention.

The disclosed mould tool is intended to be used in a press with essentially parallel press surfaces for applying the necessary pressure on the mould during the heating and cooling steps of the production process. The press may be a conventional large scale facility press or any suitable press system that can provide the required pressure in the mould cavity in order to achieve the desired material properties. According to one embodiment, the press comprises temperature control means for heating and/or cooling the mould tool during the production process. Alternatively, the mould tool can be provided with suitable temperature control means FIG. 1 is a schematic perspective view of a first embodiment of a mould tool 10 according to the present invention. The mould tool 10 comprises a first mould member 20 and a second mould member 30. In FIG. 1 the mould tool 10 is shown in an opened state, wherein the second mould member 30 is lifted off the first mould member 20 and turned upside down. A recess 50 in the first mould member 20 defines a portion of a mould cavity volume (hereafter also referred to as 50) and sealing means 40 is fitted along the outer peripheral edge of the first mould member 20. FIGS. 2a to 2c schematically show a cross sectional view of the the mould tool 10 of FIG. 1 along A-A, in the different stages of moulding an embryo body. As can be seen in the FIGS. 2a and 2b, the first mould member 20 and the second mould member 30 are moveable with respect to each other in a direction perpendicular to the press surfaces (see FIG. 3) of a press system, and sealing means 40 is arranged to provide an essentially hermetic seal between the first 20 and second 30 mould member during at least a portion of such a relative motion, in order to preserve the desired pressure inside the mould cavity. Together, the first 20 and second 30 mould member encloses and defines the closed mould cavity 50 (in the FIGS. 2a and 2b the cavity 50 is shown filled with plastisol) of variable volume.

In the disclosed examples, the mould cavity 50 is formed to produce embryo bodies of flat rectangular panel shape that in later stages of the process are further expanded and cured to form panels of rigid polymer foam material with excellent mechanical properties. Depending on the application of the finished rigid foam material, the mould cavity may be of different shapes, such as spherical, tubular, cylindrical etc.

Figure 3:
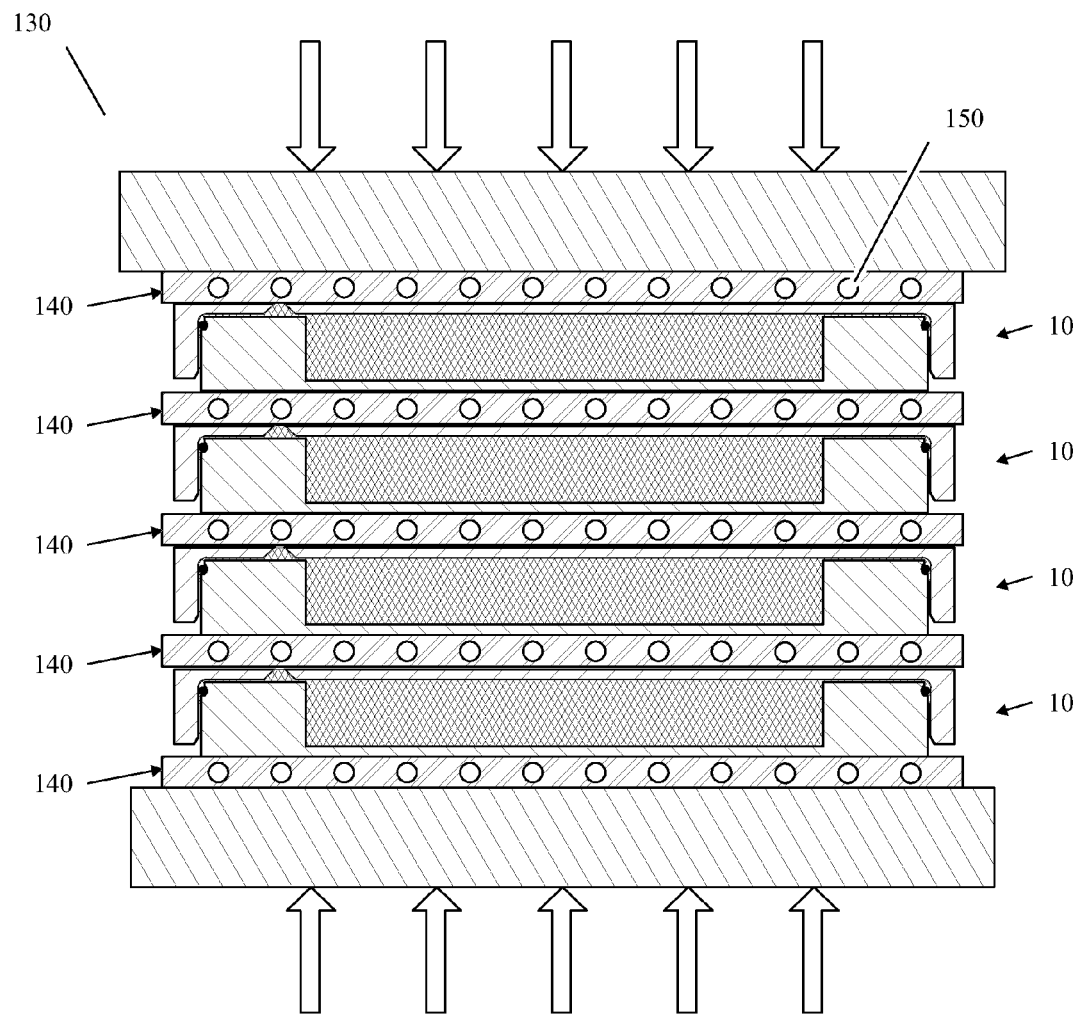
FIG. 3 schematically show four mould tools 10 according to FIG. 2, stacked on top of each other in a press, with temperature control plates arranged on both sides of each mould tool.

According to the disclosed embodiment, each one of the first and second mould members 20 and 30 comprises a major wall 60 and 70 respectively, parallel with and arranged to be adjacent the respective press surface (see FIG. 3). The first mould member 20 comprises an essentially perpendicular side wall 80 that circumscribes the major wall 60, the outer periphery 90 of the side wall 80 forms the outer peripheral edge of the first mould member 20, where the sealing means 40 is fitted.

The second mould member 30 comprises a rim 100 that closely circumscribes the outer peripheral edge 90 of the first mould member and the sealing means 40 is arranged to seal the gap formed between the rim 100 and the outer peripheral edge 90.

As mentioned above, the mould cavity 50 is filled with plastisol in FIG. 2a. In order to achieve evacuation of air trapped between the mould members 20 and 30 when the mould cavity 50 is filled with plastisol, the second mold member 30 (being the top one) in the disclosed embodiment is provided with a small evacuation opening 180. The evacuation opening 180 is formed to allow air to pass, but to prevent plastisol to escape from the mould cavity 50. According to one embodiment, the evacuation opening 180 is so small that the plastisol itself closes the opening due to the high viscosity, whereby only a small amount of plastisol is allowed to leak out of the mould. However other types of self closing evacuation openings may be used, such as valve type openings, wherein the plastisol act on a valve body to close the opening. In order to facilitate removal of the embryo body 110 from the mould members 20 and 30, the evacuation opening is formed to avoid that the gelatinized embryo body get stuck therein. One way to avoid this is to make the evacuation opening of conical shape with the broad end open to the chamber and a small top opening open to the outside of the mould. As will be shown below, the mould tool 10 is adapted to be used in a press system with parallel pres planes, whereby the small top opening is covered by a press plane and the open area is further reduced. As discussed above, the mould process comprises heating the plastisol in a closed mould, whereby a high pressure is created by the thermal expansion of the plastisol and the activation of the blowing agent dissolved therein. The plastisol is kept at elevated temperature a predetermined time to allow the plastisol to gelatinize, where after the mould 10 is cooled to a temperature that is low enough to allow removal of the embryo body 110 from the mould. FIG. 2b shows the mould tool 10 after the heating step of the production process, wherein the mould cavity volume has been allowed to increase by 5 to 20 percent compared to the filling volume depending on the type of plastisol mix and the process parameters that are used. FIG. 2c shows the mould tool when the second mould member is lifted off the first member, whereby the compressed embryo body 110 is starting to pop out from the mould 10 by the internal expansion forces, and FIG. 2d shows the relaxed embryo body after it has popped out from the first mould member 20. In the FIGS. 2b to 2d, the resulting relative movement of the first and second mould members, 20 and 30 respectively, is exaggerated for illustrative purposes, whereby excess material 120 formed between the upper surface of the side wall 80 and the major wall 70 of the second mould member represent an significant volume of waste material that has to be removed. However, in production scale mould tools 10, the excess material 120 will be less than the previously accepted leakage volume of 8%. The evacuation opening 180 produces a nipple 190 on the gelatinized embryo body, which is removed together with the excess material 120.

Compared to a conventional plunger type mould tool with variable mould cavity volume, the disclosed embodiments can all be made with thinner major walls 60, 70 whereby the resulting mould tool height can be kept as low as possible, whereby a larger number mould tools 10 can be processed in one press of predetermined size (height). Moreover, the thin major walls 60, 70 promote more precise temperature control inside the mould cavity 50, which is of great importance. Therefore, the excess material 120 produced is compensated for. Moreover, due to the fact that at least a portion of the embryo body 110 extends above, and even over the upper surface of the side wall 80, the embryo body 110 is apt to automatically pop put of the mould tool by it self, as soon as the tool is opened, which not always is the case in a conventional plunger mould tool.

FIG. 3 schematically show four mould tools 10 according to FIG. 2, stacked on top of each other in a press 130, with temperature control plates 140 arranged on both sides of each mould tool 10. The press 130 can be any type of press that can apply the desired pressure on the stack of mould tools. The temperature control plates 140 are provided with conduits for heating/cooling media 150. From this figure, the benefit of the thin major walls 60, 70 is evident, both with respect to temperature control and overall tool height. The number of mould tools 10 that simultaneously can be stacked in one press 130 is limited by the opening height of the press with respect to the height needed to remove the mould tools from the press after the expansion process. In one embodiment, the embryo body 110 is removed from the mould tool 10 when still in the press 130, as can be seen from FIG. 2*d* this requires a fair amount of space above the first mould member 20. In another embodiment, the mould tool 10 is removed from the press 130 before it is opened and the embryo body 110 is allowed to pop out.

The mould members 20, 30 may be comprised of any suitable rigid material with reasonable thermal conductivity. It may e.g be comprised of a metal such as aluminum, stainless steel or the like. Alternatively, or in combination it may be comprised of a composite material, such as fiber reinforced plastics.

FIGS. 4*a* to 4*c* shows still another embodiment, wherein also the second mould member 30 defines a portion of the initial filling volume 50, and thus also comprises a side wall 150 that circumscribes the major wall 70 in the same manner as the first mould member 20. The rim 100 of the second mould member 30 is then formed as an extension of the side wall 150. Compared to the above embodiments, this mould tool 10 must be filled in closed position, but as will be discussed below, filling the mould in the closed state is in several aspects advantageous compared to filling the first mould member in the open state and thereafter applying the second mould member thereon.

Due to the high pressure in the mould during the mould process; up to and exceeding 200 atm, the side walls 80, 150 of the mould members 20, 30 preferably are designed to preserve the dimension of the gap between the outer peripheral edge 90 and the rim 100. According to one embodiment, the side wall(s) 80, 150 is (are) dimensioned so that the reduction of the gap between the outer peripheral edge 90 and the rim 100 is less than 25%, preferably less than 20% and most preferably less than 15% at an internal pressure of 200 atm.

FIG. 5 shows an example of a mold tool, wherein, the lower portion of the sidewall 80 has a large cross sectional width in order to withstand the high pressures involved without significant deformation, but wherein the upper portion 85 is thinner in order to minimize the excess material 120 produced.

During moulding, the plastisol comes into contact with and applies a high pressure on the sealing means 40 in the gap. In order to retain the sealing means 40 in position, the outer peripheral edge 90 is formed to retain the sealing means 40. For some combinations of plastisol and sealing means 40 the plastisol strongly adheres to the sealing means 40, due to material characteristics and/or physical shape of the sealing means 40. In some embodiments, the adhesion of the sealing means 40 to the embryo body 110, and/or degradation of the sealing means 40 due to the high pressure etc. might require that the sealing means 40 must be replaced after each moulding cycle. By forming the peripheral edge 90 and the sealing means 40, so that the sealing means 40 are detached from the mould member 20 together with the moulded embryo body 110, as is shown in FIG. 2*b*, the step of removing the sealing means is omitted. As the embryo body 110 produced with the disclosed mould tool 10 requires that excess material 120 is removed after moulding, the sealing means 40 attached thereto will be removed in the same process.

According to one embodiment, the sealing means 40 comprises an elastomeric seal member, e.g. comprised of, rubber, silicone, or the like. As is shown in the figures, the elastomeric seal member may have a circular cross sectional shape or it may alternatively have one or more ridges to achieve the desired sealing effect.

Figures 6A, 6B:
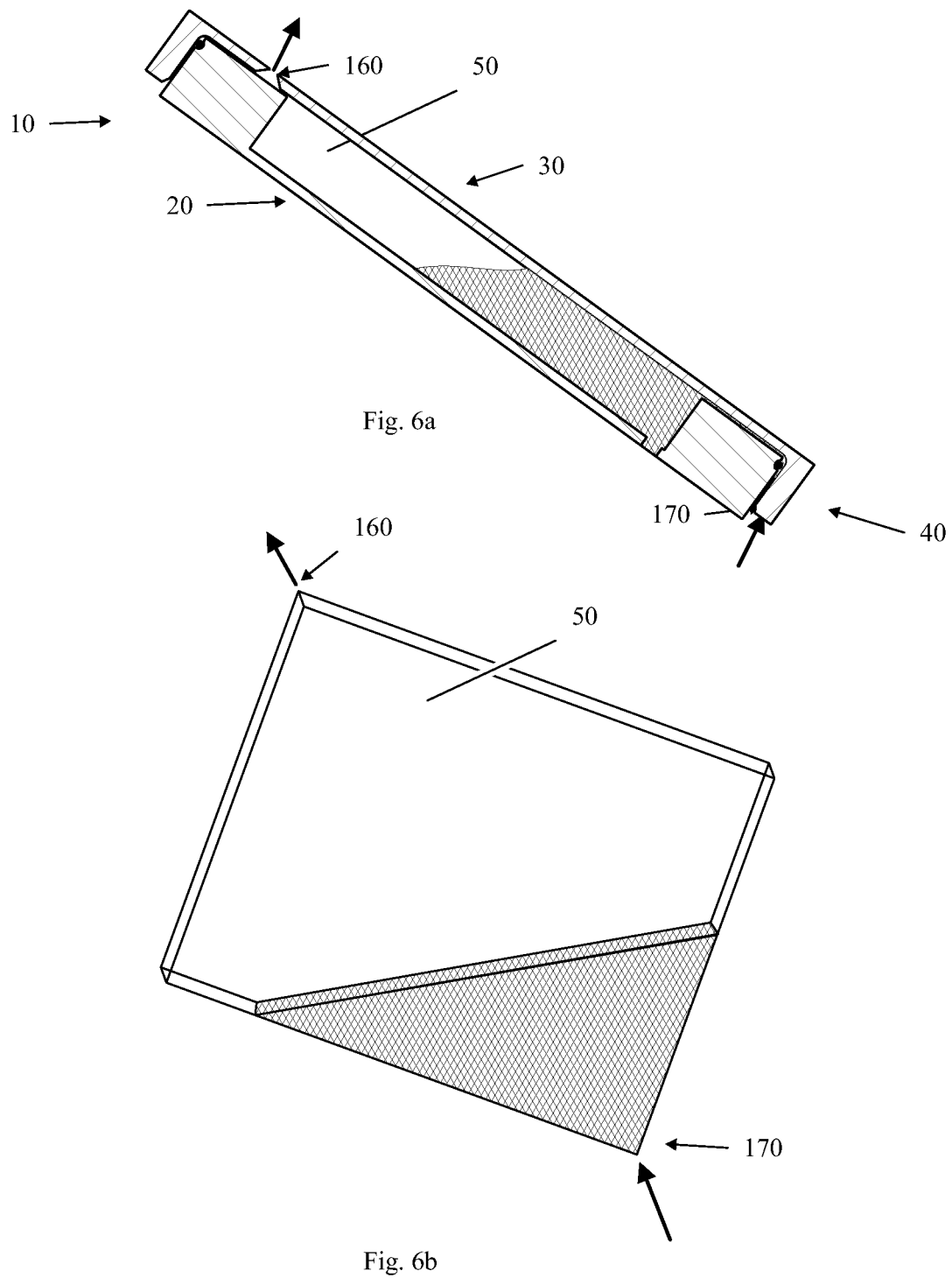
FIGS. 6a and 6b shows a mould tool positioned in a filling position.

In order to avoid surface defects on the embryo body, it is of great importance that essentially all air is evacuated from the mould tool 10 before the moulding cycle is initiated. In order to avoid entrapment of air in the mould tool 10, an evacuation outlet 160 can be arranged at or in the vicinity of the highest point of the mould cavity 50 when the mould is positioned in a filling position. FIG. 6*a* shows a mould tool 10 with a plastisol inlet 170 and an evacuation outlet 160. In FIG. 6*a*, the mould tool 10 is positioned in a filling position, wherein the mould is tilted so that the evacuation outlet 160 essentially is located at the highest point of the mould cavity 50. The plastisol inlet 170 may be arranged in the lower region of the mould cavity 50, but it may also be arranged at an intermediate or even high position, depending on the viscosity of the plastisol. FIG. 6*b* shows a schematic view of a rectangular mould cavity 50 that is positioned with the evacuation outlet 160 at the uppermost corner and the plastisol inlet 170 at the lowest corner to ensure complete evacuation of the mould cavity irrespective of the viscosity of the plastisol. When the mould cavity is completely filled, the inlet 170 and outlet 160 are hermetically closed.

As disclosed above, the expansion of the plastisol during the moulding process is between 5 and 20% and during this process it is important that the high pressure is preserved in the mould. However under certain circumstances, the pressure build up in the mould can reach extreme levels due to improper plastisol mix or overfilling. According to one embodiment, the mold tool is designed so that the moveable mold member provides an essentially hermetic sealing effect at an increase of mould cavity 50 volume of a predetermined value between 6 and 20% with respect to a filling volume, where after the sealing effect is arranged to be reduced to avoid overpressure in the mould cavity. According to an alternative embodiment, the sealing effect is gradually reduced moreover, one of the mould members may be designed to provide an adjustable expansion limit.

Figure 7:
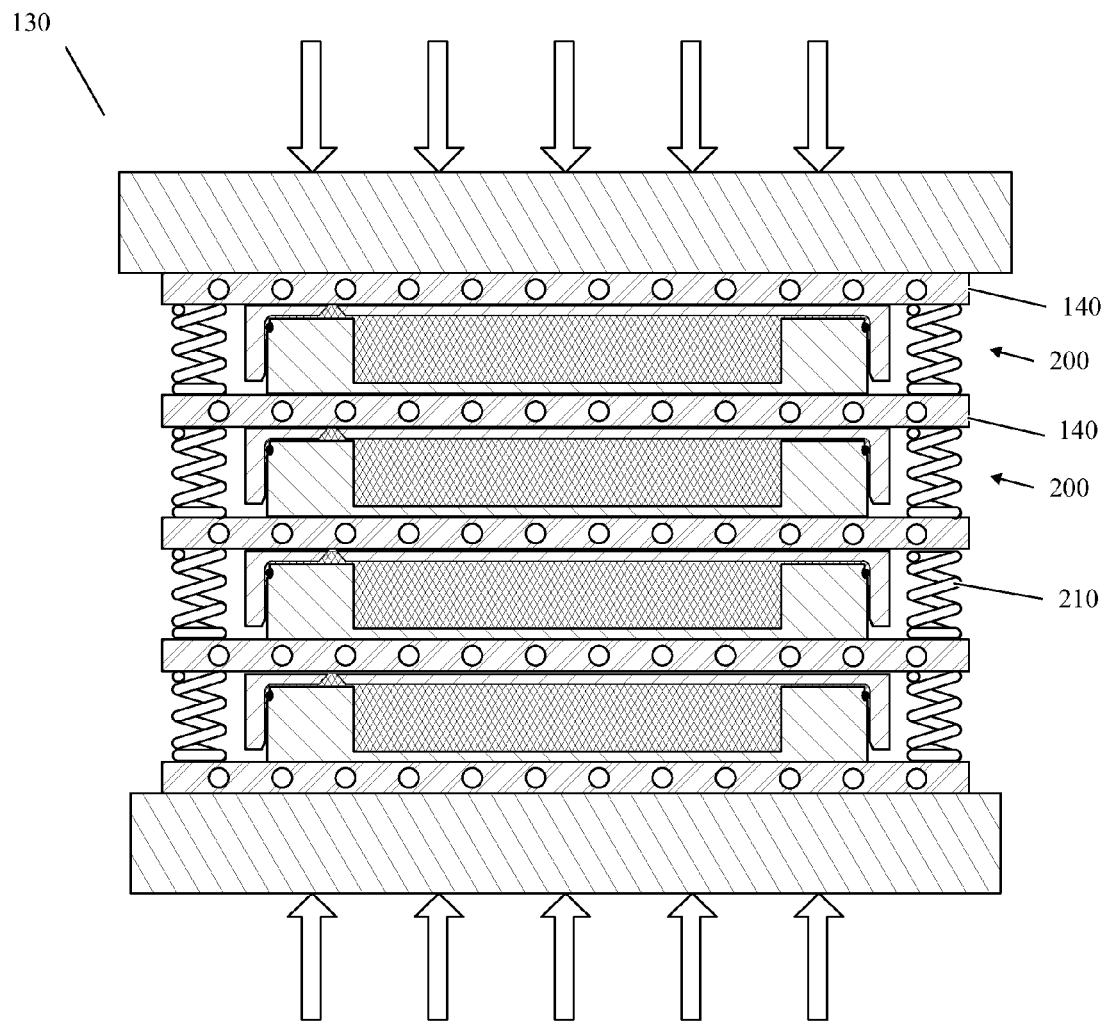
FIG. 7 schematically show a cross sectional view of a one embodiment of a press system according to the present invention.
Figure 8:
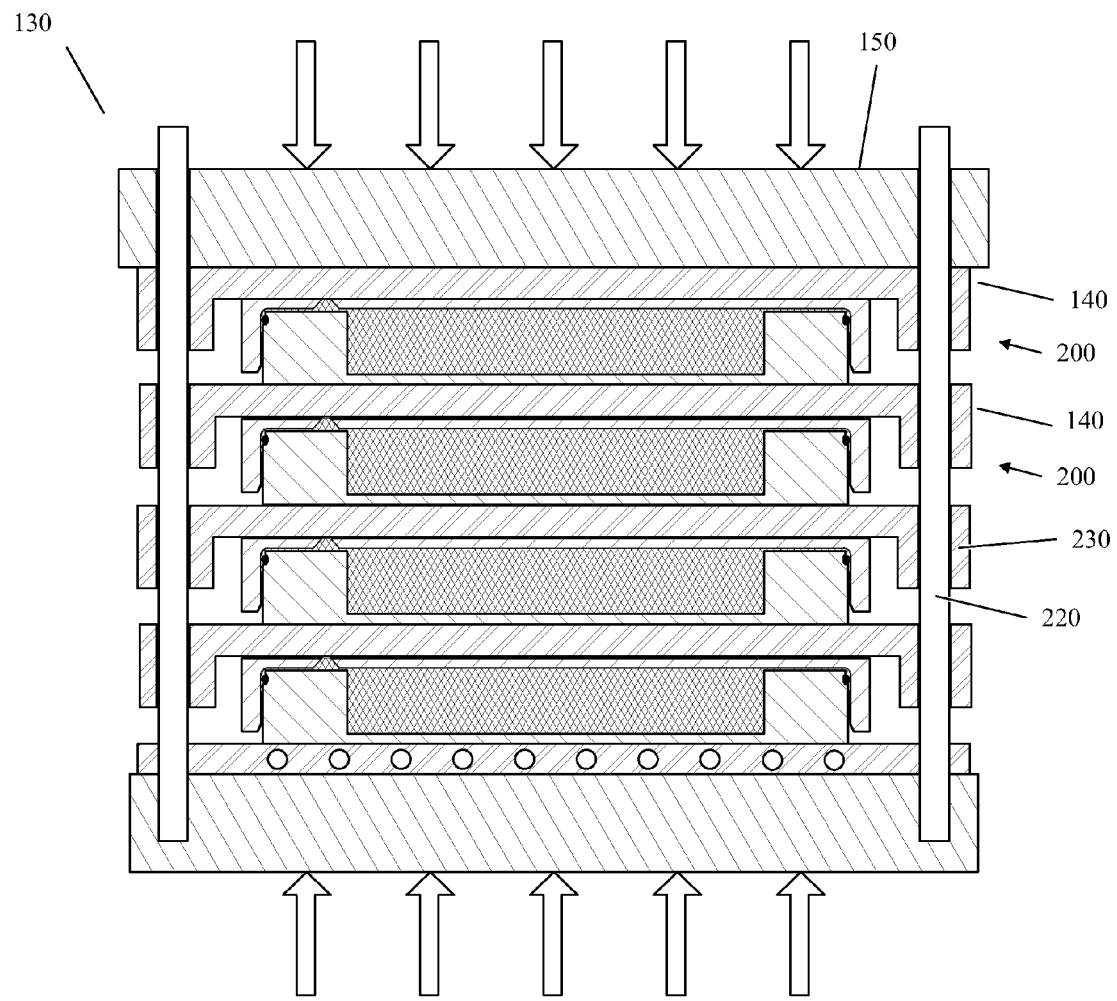
FIG. 8 schematically show a cross sectional view of a one embodiment of a press system according to the present invention.
Figure 9:
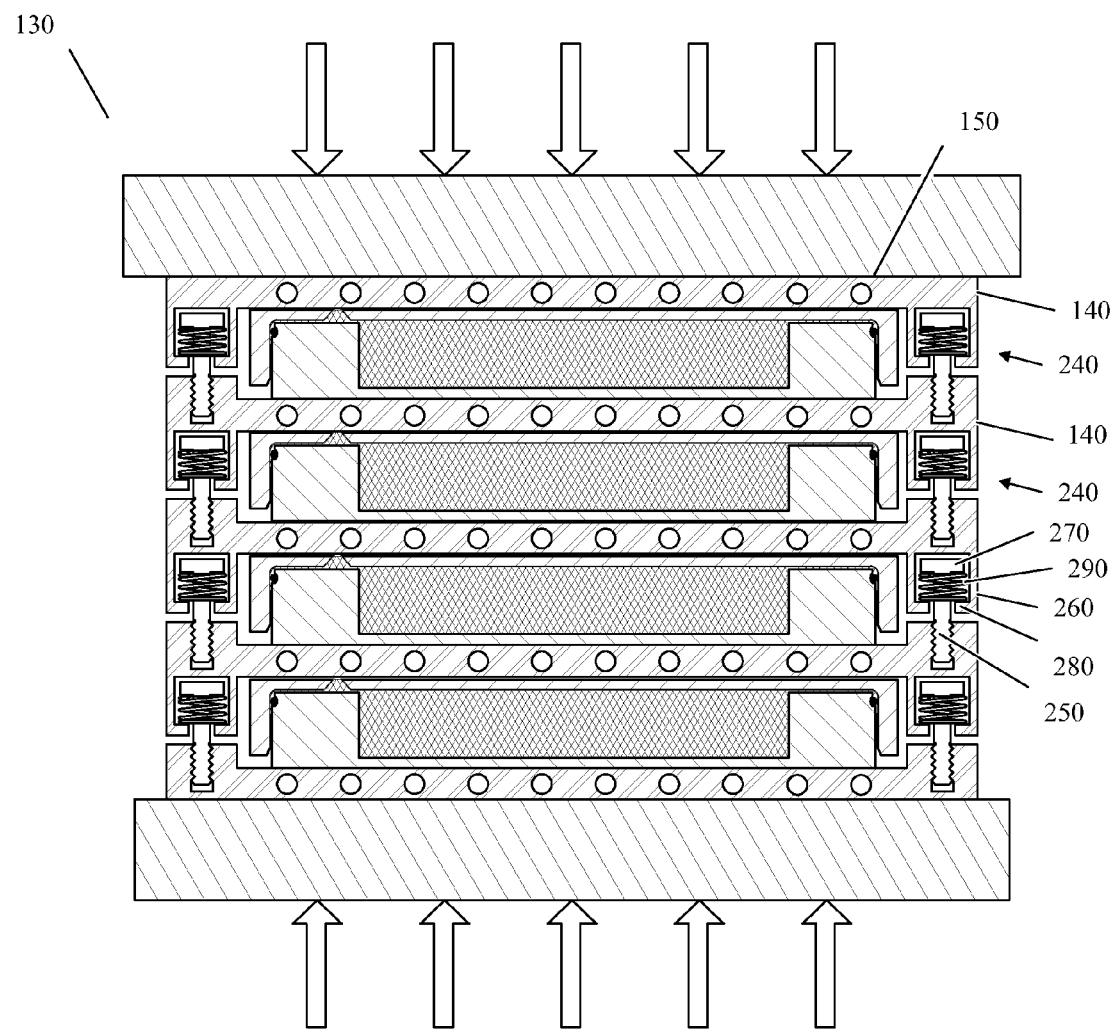
FIG. 9 schematically show a cross sectional view of a one embodiment of a press system according to the present invention.

When producing flat panels it is desirable that the moveable mould members 20 and 30 are kept parallel during moulding. In case of non parallel surfaces, the moulded panel has to be machined to make the major surfaces parallel, which result in additional waste material. According to one embodiment, disclosed in FIGS. 7 to 9, there is provided a press system 130 for production of rigid expanded polymer embryo bodies using multiple mould tools 10 of variable volume according to above. The press system 130 comprises essentially parallel main press surfaces 130*a* and 130*b*, and a plurality of intermediate temperature control plates 140. The press system 130 is arranged to receive mould tools 10 in between the temperature control plates 140 in an alternating manner, and in order to provide parallel press surfaces for all mould tools 10 the press system 130 comprises paralleling means 200 arranged to keep the temperature control plates 140 parallel during the moulding process. The paralleling means 200 can be of different type as long as parallel press surfaces are achieved for all mould tools in the press system 130. According to the embodiment disclosed in FIG. 7, the paralleling means comprises three or more symmetrically arranged compression spring members 210 in between each pair of temperature control plates 140. The spring members 210 are selected and placed, so that a leveling counter force is achieved and all temperature control plates 140 are kept parallel, hence the wording symmetrically arranged. According to the embodiment disclosed in FIG. 8, the paralleling means comprises elongated guides 220 and associated guide blocks 230 on the temperature control plates 140. The embodiment disclosed in FIG. 9 comprises three or more symmetrically arranged movement limiting members 240 between each pair of temperature control plates 140. The movement limiting members 240 are formed to hinder continued movement of a temperature control plate, beyond a predetermined point by application of a counter force that increases by the local movement at each movement limiting member 240. According to the embodiment disclosed in FIG. 9 each movement limiting members 240 is comprised of a threaded bolt 250 attached to the top surface of a temperature control plate 140, and a sleeve 260 attached to the bottom surface of the adjacent temperature control plate 140 in the upwards direction. The threaded bolt has a flange 270 at the upper end, and the sleeve an inner flange 280 at its lower end. The sleeve 260 is arranged so that it circumscribes the upper end of the bolt 250 and a compression spring 290 is arranged in between the bolt flange 270 and the sleeve inner flange 280. The spring 290 is selected to provide the counter force required to keep the plates parallel. The threading of the bolts allows the limiting characteristics to be adjusted, and the final mould volume can be varied.

The invention claimed is:

1. Mould tool to be arranged in a press with essentially parallel press surfaces for production of rigid expanded polymer embryo bodies, the mould tool comprises a first mould member and an second mould member that are moveable with respect to each other in a direction perpendicular to the press surfaces, and sealing means providing an essentially hermetic seal between the first and second mould member during at least a portion of such a relative motion, thereby defining a closed mould cavity of variable volume, wherein the first mould member defines at least a portion of the mould cavity volume and comprises an outer peripheral edge, and the second mould member comprises a rim that closely circumscribes the outer peripheral edge of the first mould member and wherein the sealing means is arranged in the gap formed between the rim and the outer peripheral edge wherein the profiles of said outer peripheral edge and said rim are shaped so that said sealing means is in contact with, and provides an essentially hermetic seal between the first mould member and the second mould member until an increase of mould cavity volume of a predetermined value between 6 and 20% with respect to a filling volume is reached, following which the gap is formed between the rim (100) and the outer peripheral edge (90) increases so that the sealing effect is reduced in order to avoid overpressure in the mould cavity.

2. Mould according to claim 1 wherein said sealing means is adapted to provide an essentially hermetic sealing effect until an increase of mould cavity volume of a predetermined value between 6 and 20% with respect to a filling volume is reached, following which the sealing effect is arranged to be gradually reduced to avoid overpressure in the mould cavity by a reduction of the gap between the outer peripheral edge and the rim.

3. Mould according to claim 2 wherein the embryo body to be moulded is shaped as a flat panel, wherein each one of the first and second mould members comprises a major wall, parallel with and arranged to be adjacent the respective press surface, and wherein the first mould member comprises an essentially perpendicular side wall that circumscribes the major wall, the outer periphery of the side wall forming the outer peripheral edge.

4. Mould according to claim 3 wherein the major walls have essentially identical thermal properties.

5. Mould according to claim 4 wherein the major walls are made of the same material and of essentially the same thickness.

6. Mould according to claim 3 wherein the major walls are made of metal.

7. Mould according to claim 3 wherein the second mould member comprises a side wall that circumscribes the major wall, and the rim is formed as an extension of the side wall.

8. Mould according to claim 3 wherein the side wall is dimensioned so that the reduction of the gap between the outer peripheral edge and the rim is less than 25% at an internal pressure of 200 atm.

9. Mould according to claim 2 wherein the outer peripheral edge is formed to retain the sealing means.

10. Mould according to claim 9 wherein the outer peripheral edge is formed to support the sealing means when exposed to mould pressure, but to allow the sealing means to he attached to and detached together with the moulded embryo body.

11. Mould according to claim 2 wherein the sealing means comprises an elastomeric seal member.

12. Mould according to claim 10 wherein the elastomeric seal member is a rubber o-ring.

13. Mould according to claim 2 wherein an evacuation outlet is arranged at or in the vicinity of the highest point of the mould cavity, when the mould is positioned in a filling position.

14. Press system for production of rigid expanded polymer embryo bodies comprising essentially parallel press surfaces and a plurality of temperature control plates arranged in between the press surfaces, wherein the press system is arranged to receive mould tools according to claim 1 in between the temperature control plates in an alternating manner, and wherein the press system comprises paralleling means arranged to keep the temperature control plates parallel during the moulding process.

15. Press system according to claim 14, wherein the paralleling means comprises elongated guides and associated guide blocks on the temperature control plates.

16. Press system according to claim 14, wherein the paralleling means comprises three or more symmetrically arranged compression spring members in between each pair of temperature control plates.

17. Press system according to claim 14, wherein the paralleling means comprises three or more symmetrically arranged movement limiting members between each pair of temperature control plates.

18. Mould according to claim 2 wherein the side wall is dimensioned so that the reduction of the gap between the outer peripheral edge and the rim is less than 20% at an internal pressure of 200 atm.

19. Mould according to claim 2 wherein the side wall is dimensioned so that the reduction of the gap between the outer peripheral edge and the rim is less than 15% at an internal pressure of 200 atm.

20. Mould tool with a closed mould cavity of variable volume for production of rigid expanded polymer embryo bodies, the mould comprises at least one static member and one moveable member that enables the mould cavity volume to be varied during moulding, and sealing means able to provide an essentially hermetic seal between the static and the moveable member until an increase of mould cavity volume of a predetermined value between 6 and 20% with respect to a filling volume, following which a gap formed between the static member and the moveable member increases so that the sealing effect is gradually reduced in order to avoid overpressure in the mould cavity.

21. Mould tool to be arranged in a press with essentially parallel press surfaces for production of rigid expanded polymer embryo bodies, the mould tool consists of a first mould member and an second mould member that are moveable with respect to each other in a direction perpendicular to the press surfaces, and sealing means providing an essentially hermetic seal between the first and second mould member during at least a portion of such a relative motion, thereby defining a closed mould cavity of variable volume, wherein the first mould member defines at least a portion of the mould cavity volume and comprises an outer peripheral edge, and the second mould member comprises a rim that closely circumscribes the outer peripheral edge of the first mould member and wherein the sealing means is arranged in the gap formed between the rim and the outer peripheral edge wherein the profiles of said outer peripheral edge and said rim are shaped so that said sealing means is in contact with, and provides an essentially hermetic seal between the first mould member and the second mould member until an increase of mould cavity volume of a predetermined value between 6 and 30% with respect to a filling volume is reached, following which the gap is formed between the rim (100) and the outer peripheral edge (90) increases so that the sealing effect is reduced in order to avoid overpressure in the mould cavity.

* * * * *